(12) United States Patent
Ozols

(10) Patent No.: US 10,252,903 B2
(45) Date of Patent: Apr. 9, 2019

(54) HOSE PULLER AND METHOD

(71) Applicant: Radical Resolutions LLC, Sandy Hook, CT (US)

(72) Inventor: Peter D. Ozols, Norwalk, CT (US)

( * ) Notice: Subject to any disclaimer, the term of this patent is extended or adjusted under 35 U.S.C. 154(b) by 0 days.

(21) Appl. No.: 15/638,075

(22) Filed: Jun. 29, 2017

(65) Prior Publication Data

US 2018/0002154 A1 Jan. 4, 2018

Related U.S. Application Data

(60) Provisional application No. 62/356,123, filed on Jun. 29, 2016.

(51) Int. Cl.

| B25B 9/00 | (2006.01) |
|---|---|
| B67D 7/40 | (2010.01) |
| B25B 9/02 | (2006.01) |
| B65G 7/12 | (2006.01) |
| B67D 7/38 | (2010.01) |
| B67D 7/00 | (2010.01) |

(52) U.S. Cl.
CPC ............... B67D 7/406 (2013.01); B25B 9/02 (2013.01); B65G 7/12 (2013.01); B67D 7/38 (2013.01); B25B 9/00 (2013.01); B67D 7/00 (2013.01)

(58) Field of Classification Search
CPC .. B65G 7/12; F16L 3/1211; F16L 3/10; F16L 3/1033; F16L 3/1041; B67D 7/406; B67D 7/38; B67D 7/00; B25B 9/02; B25B 9/00
USPC .......................................... 297/468; 280/808
See application file for complete search history.

(56) References Cited

U.S. PATENT DOCUMENTS

| 735,799 | A | * | 8/1903 | McGill | |
|---|---|---|---|---|---|
| 1,275,068 | A | * | 8/1918 | Messiter | E04C 5/10 |
| | | | | | 248/78 |
| 2,873,995 | A | | 2/1979 | Turner | |
| 4,470,177 | A | * | 9/1984 | Ganung | A62C 33/04 |
| | | | | | 24/270 |
| 4,655,492 | A | | 4/1987 | Landry | |
| 5,979,840 | A | * | 11/1999 | Hollister | A62C 33/04 |
| | | | | | 239/280.5 |
| 6,447,033 | B1 | | 9/2002 | Konczak | |
| D483,668 | S | | 12/2003 | Le Roux | |
| 7,730,588 | B1 | | 6/2010 | Bernier | |
| 8,348,317 | B1 | * | 1/2013 | Bird | A45F 5/00 |
| | | | | | 248/75 |
| 9,248,967 | B1 | | 2/2016 | Gregg | |
| 9,507,371 | B1 | * | 11/2016 | Day | G05G 1/54 |

(Continued)

*Primary Examiner* — Stephen A Vu
(74) *Attorney, Agent, or Firm* — McCarter & English, LLP

(57) ABSTRACT

A device for pulling a hose and nozzle assembly comprises a laterally-extending grip manually engageable by one or both hands to grip the device and pull a hose and nozzle assembly attached thereto. A lock is spaced below the grip and is releasably engageable with the hose and nozzle assembly. The lock or hose and nozzle assembly is movable relative to the other between (i) a locked position, wherein the hose and nozzle assembly is secured by the lock to the device and the hose and nozzle assembly is supported therefrom, and (ii) an unlocked position, wherein the hose and nozzle assembly is released from the lock and detached from the device. In the locked position, the laterally-extending grip is manually engageable to pull the device, including in a position behind the back, and thereby pull the hose and nozzle assembly secured thereto.

31 Claims, 6 Drawing Sheets

(56) References Cited

U.S. PATENT DOCUMENTS

2004/0174027 A1 9/2004 Bennett
2010/0213727 A1 8/2010 Laese

\* cited by examiner

HOSE PULLER AND METHOD

CROSS-REFERENCE TO PRIORITY APPLICATION

This patent application claims benefit under 35 U.S.C. § 119 to U.S. provisional application No. 62/356,123, filed Jun. 29, 2016, entitled "Hose Puller and Method," which is expressly incorporated by reference as part of the present disclosure.

FIELD OF THE INVENTION

The present invention relates to pulling hoses and to devices for pulling hoses, such as fuel oil hoses, and more particularly, relates to devices that are attachable to fuel oil hose and nozzle assemblies to pull the hoses and to methods of pulling hoses, such as from behind the back.

BACKGROUND INFORMATION

A typical fuel oil hose, such as home heating oil hose, includes a nozzle and hose assembly, and is rotatably mounted on a fuel oil truck, such as a tanker containing home heating oil. In order to fill a home or other heating oil fuel tank, a driver or other workman holds the nozzle-end of the hose, and pulls the hose from the truck to the inlet of the fuel tank. Typically, the workman supports the nozzle-end of the hose over one shoulder, manually grips the nozzle, holds the nozzle with one more hands at about chest level, and then pulls the hose to the inlet of the fuel tank by walking with the hose held in this manner from the truck to the tank inlet.

One of the drawbacks of pulling a hose in this manner, is that the nozzle and hose, which can be filled with fuel, are heavy. In addition, when the weight of the nozzle and hose is supported over the shoulder, it can create significant forces at the shoulder, lower back and/or at other locations on the body. For example, if the workman twists or rotates his or her upper body with the nozzle and hose supported over the shoulder, the weight of the nozzle and hose can create a significant torque at the lower back. Such forces can damage the lower back. In addition, the weight of the nozzle and hose assembly can damage the shoulder or other portions of the upper body. Another drawback is that when held in front of the chest and pulled in that position, the nozzle can leak fuel oil onto the workman or onto his or her clothes.

It is an object of the present invention to overcome one or more of the above-described drawbacks and/or disadvantages of the prior art.

SUMMARY OF THE INVENTION

In accordance with a first aspect, the present invention is directed to a device for pulling a hose and nozzle assembly. The device comprises a laterally-extending grip manually engageable by at least one hand to grip the device and pull a hose and nozzle assembly attached thereto. A lock is spaced below the grip and is releasably engageable with at least one of the hose or nozzle of the hose and nozzle assembly. The lock and/or hose and nozzle assembly is movable relative to the other between (i) a locked position, wherein the hose and nozzle assembly is secured by the lock to the device and the hose and nozzle assembly is supported therefrom, and (ii) an unlocked position, wherein the hose and nozzle assembly is released from the lock and detached from the device. In the locked position, the laterally-extending grip is manually engageable to pull the device, including in a position behind the back, and thereby pull the hose and nozzle assembly secured thereto.

In some embodiments of the present invention, the device defines at least one first laterally-extending aperture defining at least in part the laterally-extending grip, and at least one second aperture spaced relative to the first aperture and defining at least in part the lock. In some such embodiments, the second aperture defines a nozzle-engaging portion and a nozzle-release portion. The nozzle-engaging portion defines a first width or diameter that is engageable with the nozzle to thereby support the nozzle on the device in the locked position. The nozzle-release portion defines a second width or diameter that is greater than the first width or diameter, and that allows the nozzle to pass through the nozzle release portion and thereby allow detachment of the hose and nozzle assembly from the device. In some such embodiments, the nozzle-engaging portion and the nozzle-release portion of the second aperture are interconnected, and allow manual movement of the nozzle between a locked position engaging the nozzle-engaging portion and a release position in the nozzle-release portion. In some embodiments, the nozzle-release portion is approximately circular shaped, and the nozzle-engaging portion is approximately partial elliptical shaped. In some embodiments, the nozzle-engaging portion is located below the nozzle-release portion to allow gravitational force and the mass of the hose and nozzle assembly to retain the nozzle within the nozzle-engaging portion. In some embodiments, the nozzle-engaging portion and the nozzle-release portion approximately define a keyhole shape.

In some embodiments of the present invention, the at least one first laterally-extending aperture includes two first laterally-extending apertures laterally spaced relative to each other. In some such embodiments, the two first laterally-extending apertures are approximately horizontally aligned, and the second aperture is spaced below the two first laterally-extending apertures. In some embodiments, a centerline of the device is located between the two first laterally-extending apertures. In some such embodiments, the second aperture is approximately symmetrical about the centerline. In some embodiments, the two first laterally-extending apertures are approximately symmetrical about the centerline.

In some embodiments of the present invention, the devices comprises a plate. In some such embodiments, the first and second apertures extend through the plate. In some such embodiments, the plate is approximately triangular shaped. In some such embodiments, the two laterally-extending apertures extend approximately parallel to a first leg of the triangle. In some such embodiments, the second aperture defines an elongated axis that is approximately perpendicular to the first leg of the triangle. In some such embodiments, the two first laterally-extending apertures extend adjacent to a first leg of the triangle, the second aperture is spaced below the two first laterally-extending apertures and defines an elongated axis of symmetry, and the two first laterally extending apertures are symmetrical about the elongated axis of symmetry. In some such embodiments, the triangle is an isosceles triangle. In some embodiments, the two first laterally-extending apertures extend from approximately one corner of the triangle to another corner of the triangle.

In some embodiments of the present invention, the nozzle defines a groove or recess on the nozzle body, and the groove or recess defines a first width. The nozzle-engaging portion of the lock defines a wall thickness that is less than the first width to allow the nozzle-engaging portion to be received within the groove or recess on the nozzle body and secure the nozzle thereto.

In accordance with another aspect, the present invention is directed to a device for pulling a hose and nozzle assembly. The device comprises first means for manually gripping the device and pulling a hose and nozzle assembly secured thereto. The device further comprises second means spaced below the first means (i) for releasably engaging at least one of the hose or nozzle of the hose and nozzle assembly, (ii) for allowing manual movement of at least one of the second means or hose and nozzle assembly relative to the other between a locked position and an unlocked position, (iii) for securing the hose and nozzle assembly to the device in the locked position, and (iv) for releasing and detaching the hose and nozzle assembly from the device in the unlocked position.

In some embodiments of the present invention, the first means is a laterally-extending grip manually engageable by at least one hand to grip the device and pull a hose and nozzle assembly attached thereto. In some embodiments, the first means is further for manually gripping the device from the behind the back and pulling the hose and nozzle assembly secured thereto from behind the back. In some such embodiments, the first means includes a right laterally-extending grip that is manually engageable behind the back by a right hand, and a left laterally-extending grip that is manually engageable behind the back by a left hand.

In some embodiments of the present invention, the second means is a lock spaced below the first means and releasably engageable with the hose and/or nozzle of the hose and nozzle assembly. The lock and/or hose and nozzle assembly is movable relative to the other between (i) a locked position, wherein the hose and nozzle assembly is secured by the lock to the device and the hose and nozzle assembly is supported therefrom, and (ii) an unlocked position, wherein the hose and nozzle assembly is released from the lock and detached from the device.

In accordance with another aspect, the present invention is directed to a method comprising the following steps:

(i) moving a nozzle of a hose and nozzle assembly into engagement with a locking portion of a device for pulling the hose and nozzle assembly, securing the nozzle thereto, and supporting the hose and nozzle assembly therefrom;

(ii) manually engaging a laterally-extending grip of the device;

(iii) holding the device in a position behind the back with the nozzle secured thereto and the hose and nozzle assembly supported therefrom; and (iv) pulling the device while held in the behind-the-back position and, in turn, pulling the hose and nozzle assembly supported therefrom.

In some embodiments of the present invention, the hose and nozzle assembly is a fuel oil hose and nozzle assembly, and step (iv) includes pulling the hose and nozzle assembly between a fuel truck and a heating oil tank. In some embodiments, step (ii) includes manually gripping with a left hand a left laterally-extending grip of the device, and manually gripping with a right hand a right laterally-extending grip of the device. In some such embodiments, the device is approximately triangular shaped, and the left and right laterally-extending grips extend adjacent and approximately parallel to one leg of the triangle. Some embodiments further comprise moving the nozzle of the hose and nozzle assembly out of engagement with the locking portion of the device and detaching the hose and nozzle assembly therefrom.

One advantage of the device and/or method of the present invention is that they allow a hose and nozzle assembly, such as a fuel oil hose and nozzle assembly, to be held in a position behind the back, and pulled in the behind-the-back position, such as from a fuel truck to a home heating oil or other tank. As a result, the hose and nozzle assembly need not be mounted or otherwise held over the shoulder, and therefore the problems encountered with shoulder pain and/or dripping of oil or other fuel onto a workman's clothes can be avoided. Yet another advantage is that by allowing the hose and nozzle assembly to be held in the behind-the-back position, and pulled in that position, the twisting and associated damage to a workman's back can be avoided. Yet another advantage of the illustrated embodiments of the invention is that the hand grips and locking aperture are symmetrical about a centerline of the device, thereby providing symmetrical gripping surfaces to support the weight of the hose, and allowing ergonomic gripping and pulling of the hose and nozzle assembly while minimizing or reducing the risk of unnecessarily twisting the lower back while pulling the hose and nozzle assembly. Yet another advantage of the currently preferred embodiments, is that the hose and nozzle assembly can be secured by the device and pulled in a behind-the-back position wherein the dispensing end of the nozzle is facing upwardly, and a handle or trigger of the nozzle is facing the ground or otherwise is positioned to prevent dripping and to avoid contact during pulling that otherwise could lead to an accidental dispensing and/or spilling of oil or other liquids from the hose or nozzle during pulling.

Other objects and advantages of the present invention, and/or of the currently preferred embodiments thereof, will become more readily apparent in view of the following detailed description of embodiments and accompanying drawings.

DETAILED DESCRIPTION OF EMBODIMENTS

Figure 1:
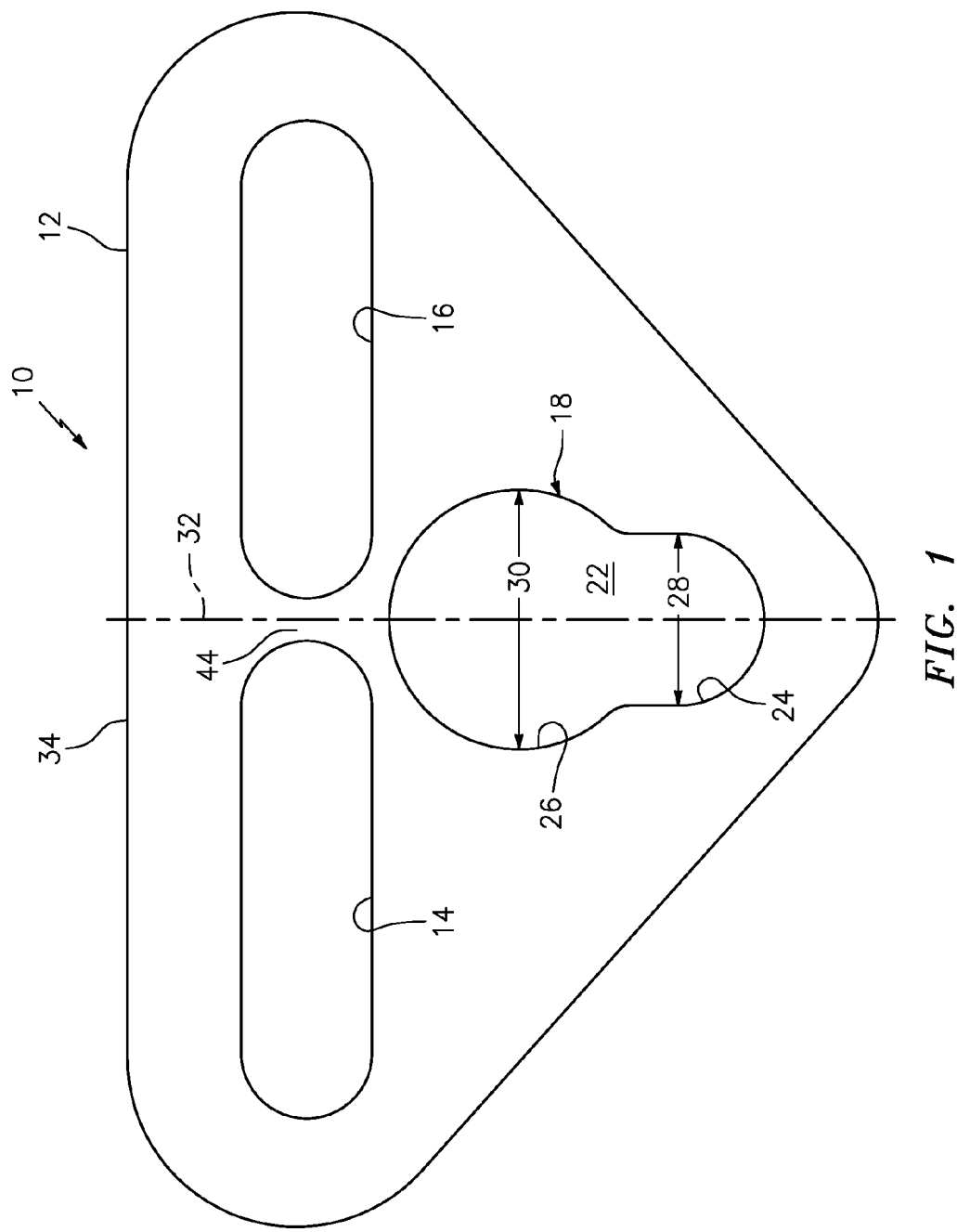
FIG. 1 is a plan view of a device for pulling a hose and nozzle assembly.
Figure 2:
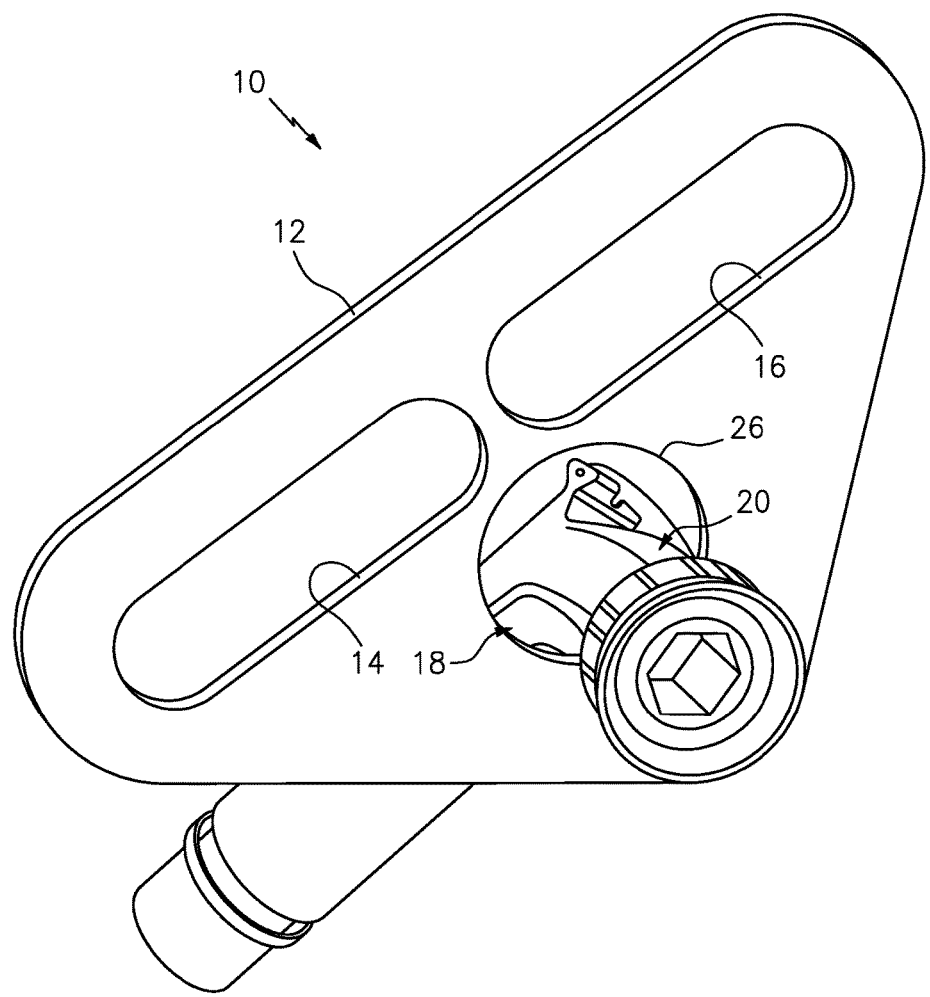
FIG. 2 is perspective view of the device of FIG. 1 illustrating a nozzle of a hose and nozzle assembly secured thereto in the locked position.
Figure 3:
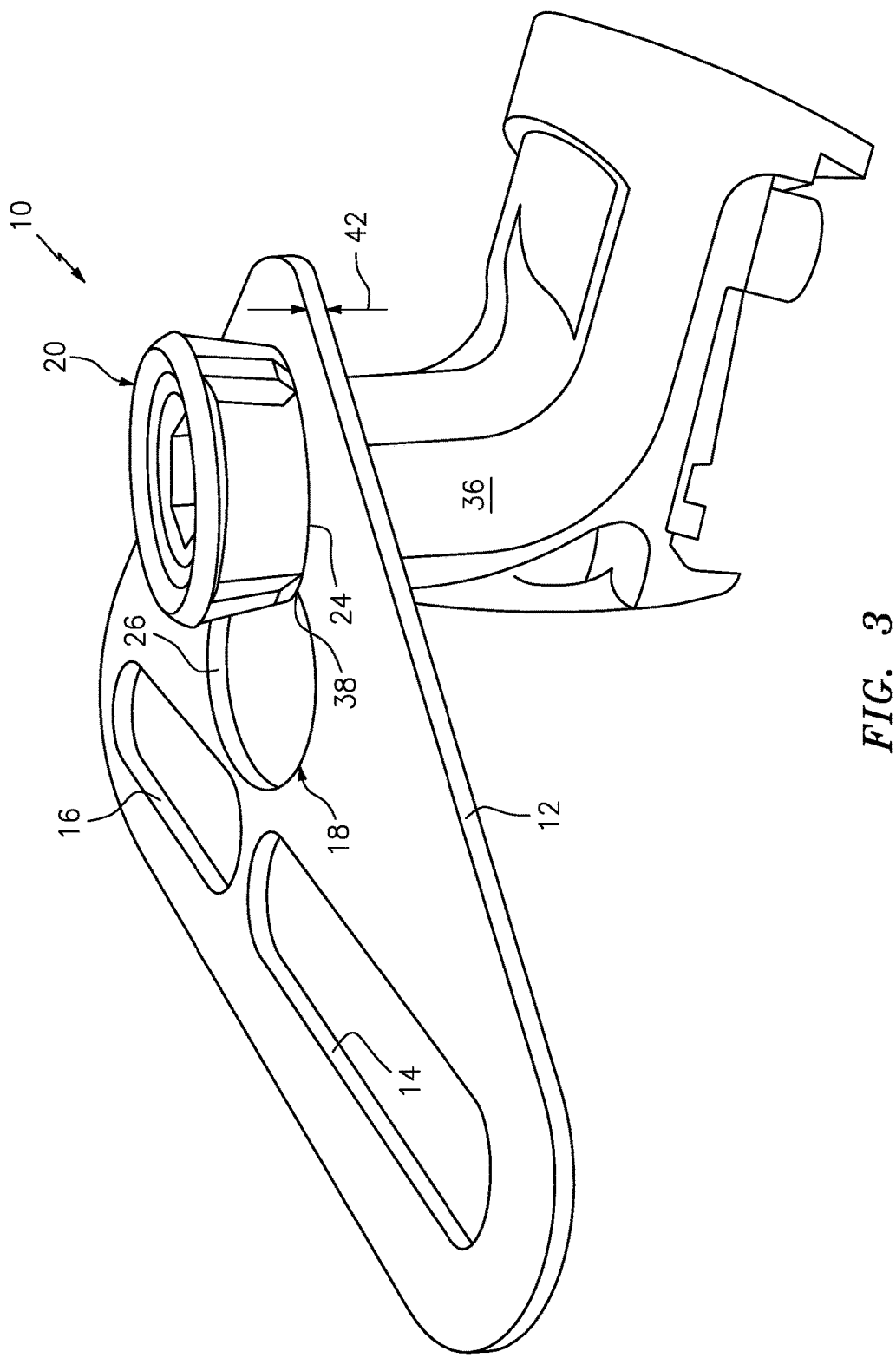
FIG. 3 is a side perspective view of the device and hose and nozzle assembly of FIG. 2 illustrating receipt of the locking portion of the device into the groove on the nozzle body.
Figure 4:
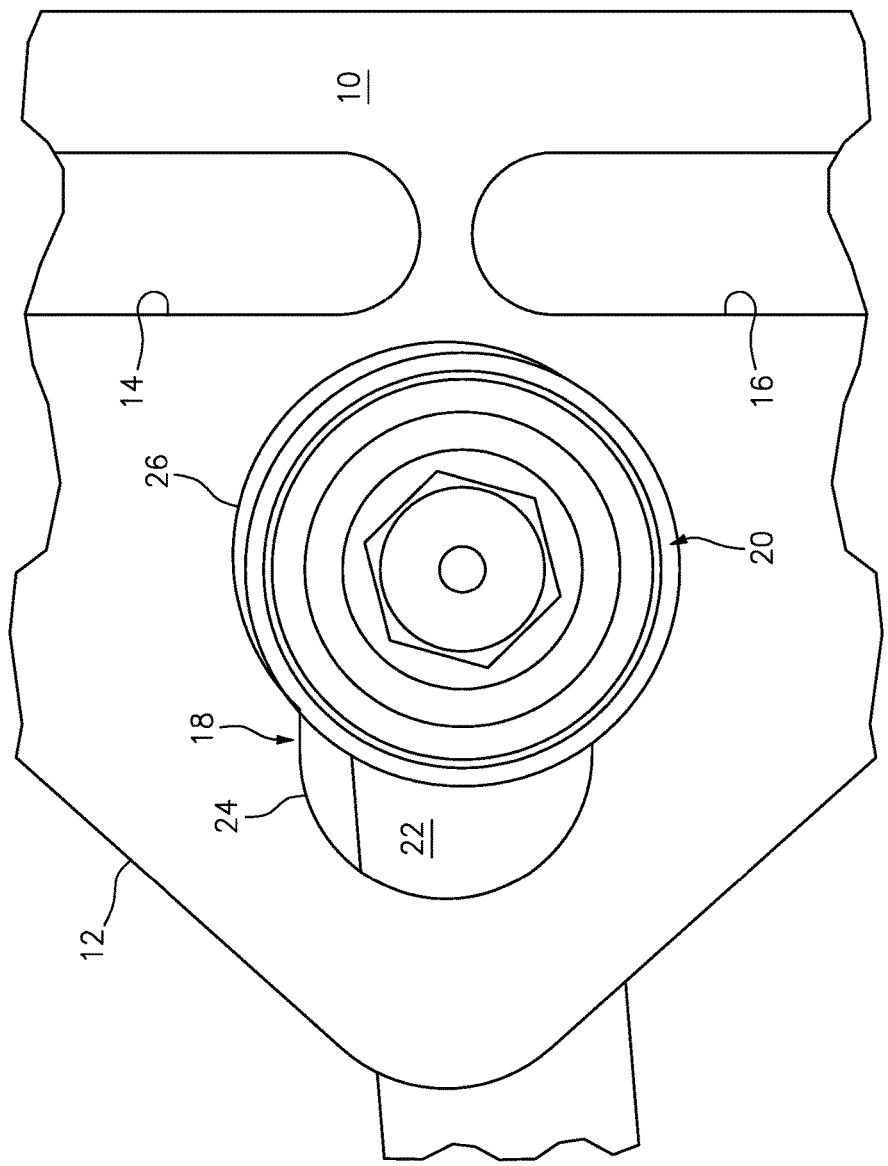
FIG. 4 is a perspective view of the device and hose and nozzle assembly of FIG. 2 illustrating the nozzle body located within the nozzle-release or expanded-width portion of the lock of the device.

In FIGS. 1 through 6, a device for pulling a hose and nozzle assembly is indicated generally by the reference numeral 10. The device 10 comprises a plate 12 defining a first laterally-extending aperture 14 forming a first laterally-extending grip, and a second laterally-extending aperture 16 forming a second laterally-extending grip. A lock 18 is spaced below the first and second grips 14 and 16, respectively, and is releasably engageable with the hose and/or nozzle of a hose and nozzle assembly 20. As shown typically in FIG. 6, the first laterally-extending grip 14 is manually engageable by a first hand, such as a left hand, to grip the device 10, and the second laterally-extending grip 16 is manually engageable by a second hand, such as a right hand, to grip the device, and pull the device while gripping it, including in a position behind the back, and thereby pull the hose and nozzle assembly 20 secured to the device. As shown typically in FIGS. 2-4, the lock 18 and/or hose and nozzle assembly 20 is movable relative to the other between (i) a locked position (e.g., FIGS. 2 and 3), wherein the hose and nozzle assembly 20 is secured by the lock 18 to the device and the hose and nozzle assembly is supported therefrom, and (ii) an unlocked position (e.g., FIG. 4), wherein the hose and nozzle assembly is released from the lock and detached from the device.

As shown typically in FIG. 1, the lock 18 is defined by a second aperture 22 spaced below the first and second laterally-extending apertures 14 and 16, respectively. The second aperture 22 defines a nozzle-engaging portion 24 and a nozzle-release portion 26. The nozzle-engaging portion 24 defines a first width or diameter 28 that is engageable with the nozzle to thereby support the nozzle on the device in the locked position. The nozzle-release portion 26 defines a second width or diameter 30 that is greater than the first width or diameter 28, and that allows the nozzle to pass through the nozzle release portion and thereby allow detachment of the hose and nozzle assembly 20 from the device. The nozzle-engaging portion 24 is located below the nozzle-release portion 26 to allow the mass of the hose and nozzle assembly 20 and gravitational force to retain the nozzle within the nozzle-engaging portion. The nozzle-engaging portion 24 and the nozzle-release portion 26 of the second aperture 22 are interconnected and allow manual movement of the nozzle between a locked position (e.g., FIGS. 2 and 3) engaging the nozzle-engaging portion, and a release position (e.g., FIG. 4) in the nozzle-release portion. In the illustrated embodiment, the nozzle-release portion 26 is approximately circular shaped, and the nozzle-engaging portion 24 is approximately partial elliptical shaped. Also in the illustrated embodiment, the nozzle-engaging portion 24 and the nozzle-release portion 26 define an approximate keyhole shape. However, as may be recognized by those of ordinary skill in the pertinent art based on the teachings herein, the illustrated shapes are exemplary and may be changed as desired or otherwise required.

As shown typically in FIG. 1, the first and second laterally-extending apertures 14 and 16 are approximately horizontally aligned and the second aperture 22 is spaced below the first and second laterally-extending apertures. A centerline 32 of the device is located between the first and second laterally-extending apertures 14 and 16. The second aperture 22 is approximately symmetrical about the centerline 32, and the first and second laterally-extending apertures 14 and 16 are approximately symmetrical about the centerline.

As shown typically in FIG. 1, the plate 12 is approximately triangular shaped. The first and second laterally-extending apertures 14 and 16 extend approximately parallel to a first leg or side 34 of the triangle. Also in the illustrated embodiment, the first and second laterally-extending apertures 14 and 16 extend from approximately one corner of the triangle to another corner of the triangle. The second aperture 22 of the lock defines an elongated axis that is coincident with the centerline 32 of the device, and is approximately perpendicular to the first leg or side 34 of the triangular plate. The first and second laterally-extending apertures 14 and 16 extend adjacent to the first leg or side 34 of the triangular plate 12, the second aperture 22 is spaced below the first and second laterally-extending apertures 14 and 16 and defines an elongated axis of symmetry that is coincident with the centerline 32 of the device, and the first and second laterally-extending apertures 14 and 16 are symmetrical about the elongated axis of symmetry. In the illustrated embodiment, the plate 10 preferably defines the shape of an isosceles triangle, and more preferably, the shape of a right isosceles triangle. However, as may be recognized by those of ordinary skill in the pertinent art based on the teachings herein, this shape is exemplary and may be changed as desired or otherwise required, including, for example, a square, rectangular, circular or elliptical shape.

Figure 5:
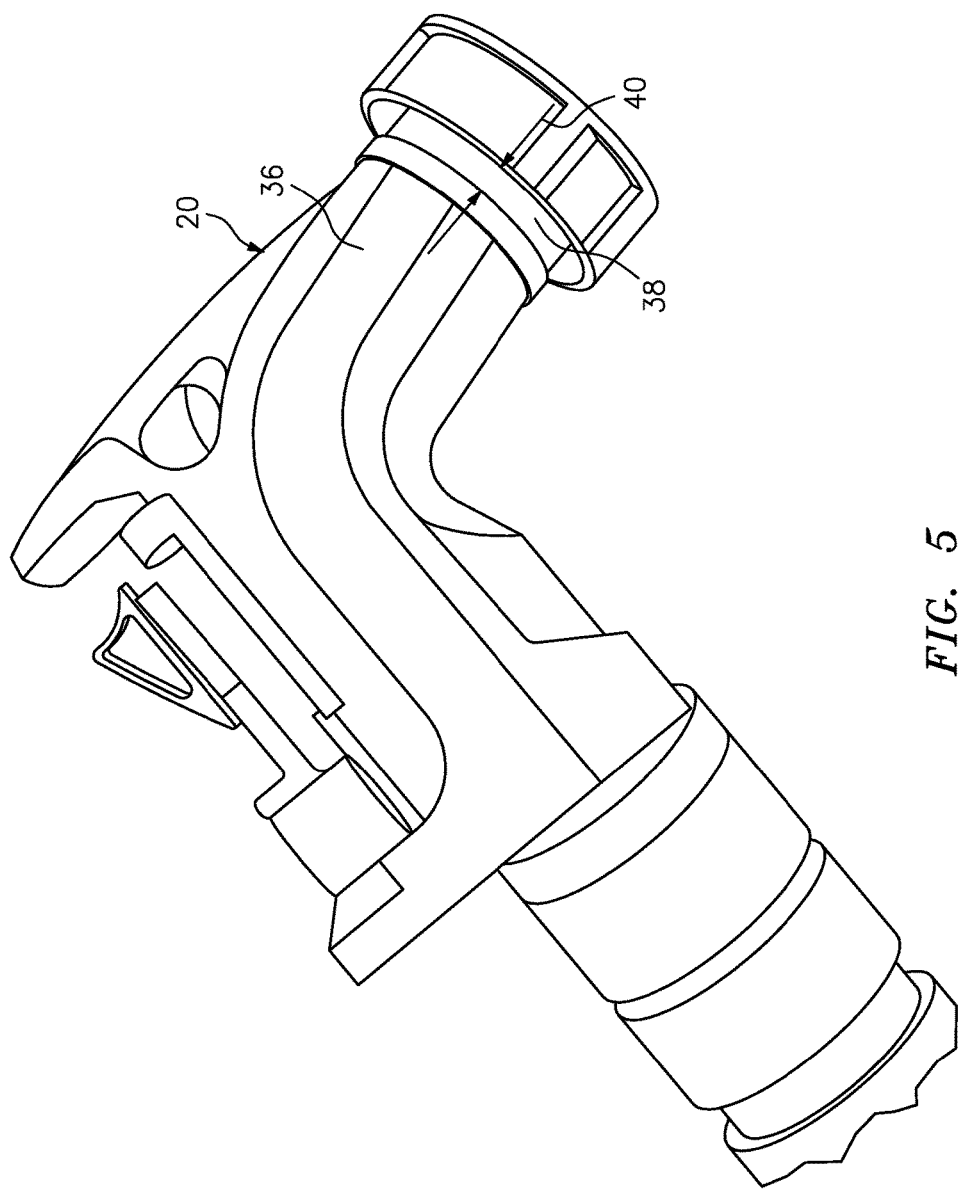
FIG. 5 is a perspective view of the nozzle body of the hose and nozzle assembly of FIG. 2 illustrating the groove on the nozzle body that receives and engages the lock of the device.

As shown typically in FIG. 5, an exemplary nozzle body 36 defines an annular groove or recess 38, and the groove or recess defines a first width 40. As shown typically in FIG. 3, the nozzle-engaging portion 24 of the lock 18 defines a wall thickness 42 that is less than the first width 40 to allow the nozzle-engaging portion 24 to be received within the groove or recess 38 on the nozzle body and secure the nozzle thereto. In the illustrated embodiment, the wall thickness 42 of the nozzle-engaging portion 24 is approximately the same as the wall thick of the plate 12. In one embodiment, the first width 40 of the nozzle groove is about ¼ inch, and the wall thickness 42 of the plate is about 3/16 inch. In addition, the width 28 of the nozzle-engaging portion 24 is greater than the inner diameter of the groove 38 of the nozzle body, but less than the outer diameter of the groove 38, in order to allow the edge of the nozzle-engaging portion 24 to be received within the groove and thereby lock the nozzle body to the device.

Figure 6:
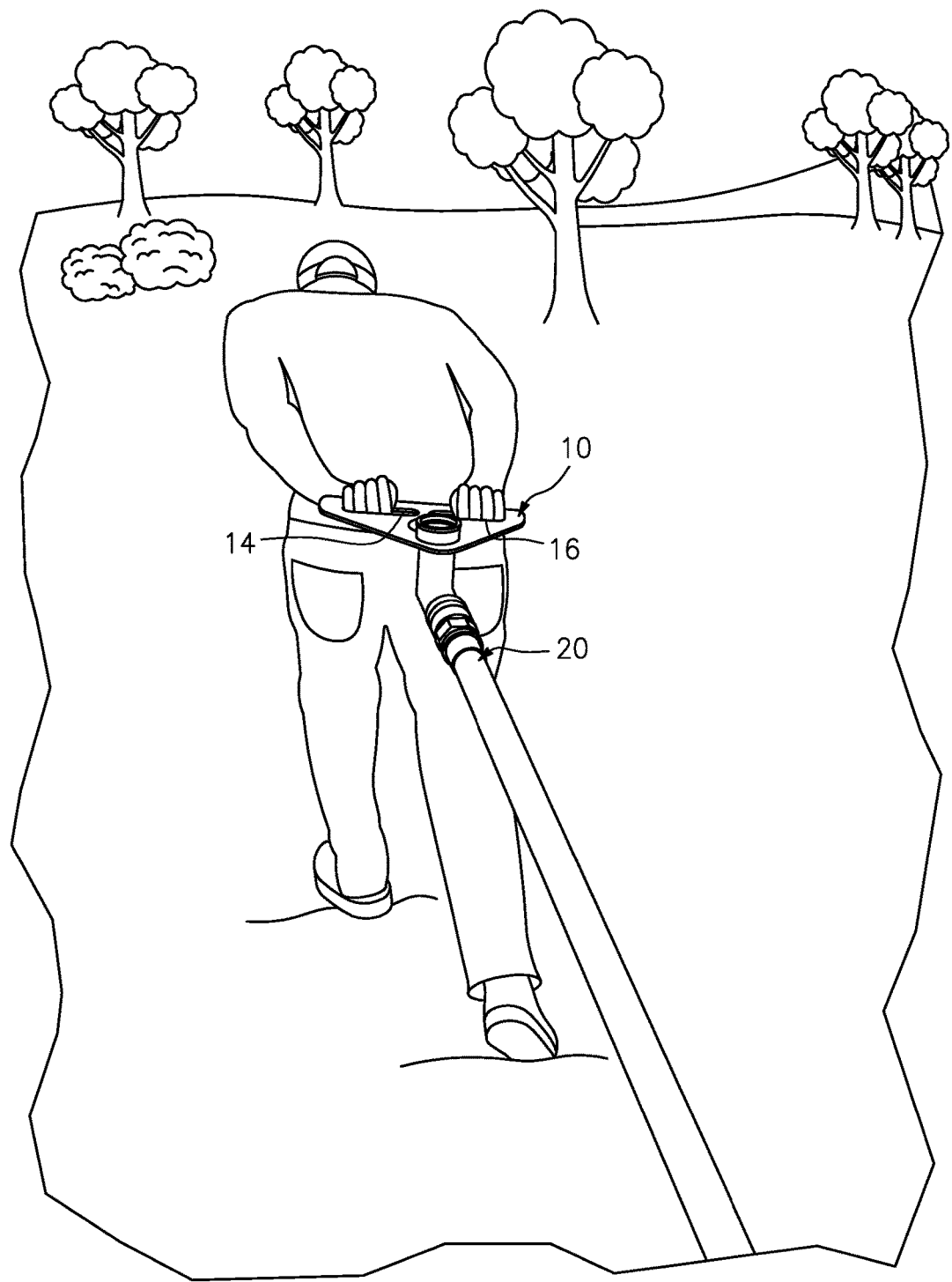
FIG. 6 is a perspective view of the device with the hose and nozzle assembly of FIG. 2 secured and supported therefrom, and illustrating the device being manually gripped by a workman in a behind-the-back position and the hose being pulled with the device in that position.

As shown typically in FIG. 6, the device 10 may be used in accordance with the following steps:

(i) moving the nozzle of a hose and nozzle assembly 20 into engagement with the lock 18 of the device 10, securing the nozzle to the lock 18, and supporting the hose and nozzle assembly 20 from the device;

(ii) manually engaging one or both of the first and second laterally-extending grips 14 and 16 of the device;

(iii) holding the device 10 in a position behind the back with the nozzle secured thereto and the hose and nozzle assembly 20 supported therefrom; and (iv) pulling the device 10 while held in the behind-the-back position and, in turn, pulling the hose and nozzle assembly 20 supported therefrom.

In the illustrated embodiment, the hose and nozzle assembly is a fuel oil hose and nozzle assembly, and step (iv) includes pulling the hose and nozzle assembly between a fuel truck and a heating oil tank, such as home or other heating oil tank. Also in the illustrated embodiment, step (ii) includes manually gripping with a left hand the left laterally-extending grip 14 of the device, and manually gripping with a right hand the right laterally-extending grip 16 of the device. When the hose and nozzle assembly is pulled to a tank, or pulled from a tank back to the truck, the procedural steps further comprise moving the nozzle of the hose and nozzle assembly 20 out of engagement with the lock 18 of the device and detaching the hose and nozzle assembly therefrom.

One advantage of the illustrated embodiment is that the hand grips 14, 16 and locking aperture 22 are symmetrical about the centerline 32 of the device, thereby providing symmetrical gripping surfaces to support the weight of the hose and nozzle assembly, and allowing ergonomic gripping and pulling of the hose and nozzle assembly while minimizing or reducing the risk of unnecessarily twisting the lower back while pulling the hose and nozzle assembly. As can be seen, the laterally-extending apertures 14, 16 and associated gripping surfaces allow users to comfortably grip the device at about the natural spacing of the hands when positioned behind the back. In the illustrated embodiment, each laterally-extending aperture defines a width extending parallel to the side 34 of the triangular plate within the range of about 4 to about 7 inches, and more preferably within the range of about 5 to about 6 inches. The web 44 extending between the laterally-extending grips defines a width extending parallel to the side 34 of the triangular plate within the range of about 0 to about 2 inches, preferably within the range about ¼ inch to about ¾ inch, and more preferably about ½ inch. In the illustrated embodiment, the plate 12 is made of aluminum; however, as may be recognized by those of ordinary skill in the pertinent art based on the teachings herein, the device may be may of any of numerous different materials that are currently known or that later become known, including any of numerous different metals, plastics, composite materials, or combinations of any of the foregoing.

As may be recognized by those of ordinary skill in the pertinent art based on the teachings herein, numerous changes and modifications made be made to the above-described and other embodiments without departing from the scope of the invention as defined, for example, in the appended claims. For example, the shape and/or dimensions of the lock may take any of numerous different shapes and/or dimensions in order to releasably secure thereto any of numerous different hoses and/or nozzle assemblies that are currently known, or that later become known. In addition, the shapes and dimensions of the device and/or of the grips may be changed as desired or otherwise required. For example, the gripping surfaces could be expanded in thickness or width, the gripping surfaces could be changed to facilitate different or particular types of grips, and more or fewer apertures forming the grips could be provided. The peripheral shape need not be triangular, but rather may be defined any of numerous other shapes, such as rectangular, circular, oval or other shapes. The device need not be limited to pulling fuel oil hose and nozzle assemblies, but rather could be modified to secure and pull any of numerous different types of hoses, nozzles, conduits, lines and/or other hose and/or nozzle assemblies, such as firefighting hoses, that are currently known, or that later become known. In addition, the device could be covered or coated in whole or in part with any of numerous different coverings or coatings that are currently known or that later become known. For example, the plate and/or the gripping portions of the plate can be coated with a polymeric coating. The coating may increase the thickness of the device, including at the grips, to facilitate gripping the device. In one such embodiment, the coating may be up to about ¼ inch thick on each side of the device or plate 12. In addition, the coating could be colored, such as with a yellow or orange color, in order to allow the device to stand out against its background, particularly if it falls onto a snow-covered ground. If desired, a harness could be attached, such as by clips, to one or both laterally-extending grips, and/or to other aperture(s) formed on the device, and the harness could in turn be attached to a workman's belt, or otherwise secured to the workman, to pull the device and a nozzle and hose assembly secured thereto with the harness. Accordingly, this detailed description of embodiments is to be taken in an illustrative, as opposed to a limiting sense.

What is claimed is:

1. A device for pulling a hose and nozzle assembly, comprising:
a laterally-extending grip manually engageable by at least one hand to grip the device and pull a hose and nozzle assembly attached thereto; and
a lock spaced below the grip, wherein the lock includes an aperture defining a fixed width or diameter and a centerline, wherein the aperture is defined at least in part by a nozzle-engaging portion engageable with at least one of the hose or nozzle of the hose and nozzle assembly, the laterally-extending grip defines an elongated axis oriented approximately perpendicular to the centerline of the lock aperture and includes a first axially-elongated gripping portion extending axially and laterally on one side of the centerline and a second axially-elongated gripping portion extending axially and laterally on an opposite side of the centerline relative to the first gripping portion, wherein the first and second axially-elongated gripping portions are approximately symmetrical about the centerline and extend axially from approximately one side or corner of the device to another side or corner of the device, and at least one of the lock or hose and nozzle assembly is movable relative to the other of the lock or hose and nozzle assembly between (i) a locked position, wherein the hose and nozzle assembly is secured by the nozzle-engaging portion to the device and the hose and nozzle assembly is supported therefrom, and (ii) an unlocked position, wherein the hose and nozzle assembly is released from the nozzle-engaging portion and detached from the device, wherein in the locked position, the first and second gripping portions of the laterally-extending grip are manually engageable on opposite sides of the centerline relative to each other to pull the device and thereby pull the hose and nozzle assembly secured thereto.

2. A device as defined in claim 1, wherein the device defines at least one laterally-extending aperture defining at least in part the laterally-extending grip, and wherein the laterally-extending aperture is spaced relative to the lock.

3. A device as defined in claim 2, wherein the at least one laterally-extending aperture includes two laterally-extending apertures laterally spaced relative to each other, wherein a first laterally-extending aperture defines the first axially-elongated gripping portion and a second laterally-extending aperture defines the second axially-elongated gripping portion.

4. A device as defined in claim 3, wherein the two laterally-extending apertures are approximately horizontally aligned and the lock aperture is spaced below the two laterally-extending apertures.

5. A device as defined in claim 4, wherein the centerline is located between the two laterally-extending apertures.

6. A device as defined in claim 5, wherein the lock aperture is approximately symmetrical about the centerline.

7. A device as defined in claim 6, wherein the two laterally-extending apertures are approximately symmetrical about the centerline.

8. A device as defined in claim 1, further comprising a plate.

9. A device as defined in claim 8, wherein the aperture extends through the plate.

10. A device as defined in claim 8, wherein the plate is approximately triangular shaped.

11. A device as defined in claim 10, further comprising two laterally-extending apertures that extend approximately parallel to a first leg of the triangle.

12. A device as defined in claim 11, wherein the lock aperture defines an elongated axis that is approximately perpendicular to the first leg of the triangle.

13. A device as defined in claim 10, further comprising two laterally-extending apertures that extend adjacent to a first leg of the triangle, wherein the lock aperture is spaced below the two laterally-extending apertures and defines an elongated axis of symmetry, and the two laterally extending apertures are symmetrical about the elongated axis of symmetry.

14. A device as defined in claim 13, wherein the triangle is an isosceles triangle.

15. A method of using the device of claim 1 comprising the following steps:
(i) moving a nozzle of a hose and nozzle assembly into engagement with the lock of the device, securing the nozzle thereto and supporting the hose and nozzle assembly therefrom;
(ii) manually engaging the laterally-extending grip of the device;
(iii) holding the device in a position behind the back with the nozzle secured thereto and the hose and nozzle assembly supported therefrom; and
(iv) pulling the device while held in the behind-the-back position and, in turn, pulling the hose and nozzle assembly supported therefrom.

16. A method as defined in claim 15, wherein the hose and nozzle assembly is a fuel oil hose and nozzle assembly, and step (iv) includes pulling the hose and nozzle assembly between a fuel truck and a heating oil tank.

17. A method as defined in claim 15, wherein step (ii) includes manually gripping with the first hand a left laterally-extending gripping portion of the device and manually gripping with the second hand a right laterally-extending gripping portion of the device.

18. A method as defined in claim 17, wherein the device is approximately triangular shaped and the first and second laterally-extending gripping portions extend adjacent and approximately parallel to one leg of the triangle.

19. A method as defined in claim 15, further comprising moving the nozzle of the hose and nozzle assembly out of engagement with the lock of the device and detaching the hose and nozzle assembly therefrom.

20. A device for pulling a hose and nozzle assembly, comprising an approximately triangular-shaped plate defining two first laterally-extending apertures extending adjacent to a first leg of the triangle from approximately one corner of the triangle to another corner of the triangle, and a second aperture spaced below the two first laterally-extending apertures and defining an elongated axis of symmetry, wherein the two first laterally-extending apertures are approximately symmetrical about the elongated axis of symmetry and the second aperture forms a lock that is releasably engageable with at least one of the hose or nozzle of the hose and nozzle assembly, wherein at least one of the lock or hose and nozzle assembly is movable relative to the other of the lock or hose and nozzle assembly between (i) a locked position, wherein the hose and nozzle assembly is secured by the lock to the device and the hose and nozzle assembly is supported therefrom and the two first laterally-extending apertures form a laterally-extending grip manually engageable by at least one hand to grip the device and pull a hose and nozzle assembly attached thereto, and (ii) an unlocked position, wherein the hose and nozzle assembly is released from the lock and detached from the device.

21. A device for pulling a hose and nozzle assembly, wherein the device defines at least one first laterally-extending aperture defining at least in part a laterally-extending grip, and at least one second aperture spaced relative to the first aperture and defining at least in part a lock, wherein the second aperture is defined at least in part by a nozzle-engaging portion and a nozzle-release portion, the nozzle-engaging portion defines a first width or diameter that is engageable with the nozzle to thereby support the nozzle on the device in a locked position, and the nozzle-release portion defines a second width or diameter that is greater than the first width or diameter and that allows the nozzle to pass through the nozzle release portion and thereby allow detachment of the hose and nozzle assembly from the device, wherein the nozzle defines a groove or recess on the nozzle body, and the groove or recess defines a first width, and the nozzle-engaging portion defines a wall thickness that is less than the first width to allow the nozzle-engaging portion to be received within the groove or recess on the nozzle body and secure the nozzle thereto, wherein at least one of the lock or hose and nozzle assembly is movable relative to the other between (i) a locked position, wherein the hose and nozzle assembly is secured by the lock to the device and the hose and nozzle assembly is supported therefrom, and (ii) an unlocked position, wherein the hose and nozzle assembly is released from the lock and detached from the device, wherein in the locked position, the laterally-extending grip is manually engageable to pull the device and thereby pull the hose and nozzle assembly secured thereto.

22. A device for pulling a hose and nozzle assembly, comprising:
first means for manually gripping the device and pulling a hose and nozzle assembly secured thereto; and
second means spaced below the first means (i) for releasably engaging at least one of the hose or nozzle of the hose and nozzle assembly, (ii) for allowing manual movement of at least one of the second means or hose and nozzle assembly relative to the other between a locked position and an unlocked position, (iii) for securing the hose and nozzle assembly to the device in the locked positon, and (iv) for releasing and detaching the hose and nozzle assembly from the device in the unlocked position, wherein the second means includes third means defining a centerline and a fixed width or diameter for engaging at least one of the hose or nozzle of the hose and nozzle assembly, the first means extends laterally on opposite sides of the centerline for manually gripping the device on opposite sides of the centerline relative to each other and pulling the hose and nozzle assembly secured thereto, the first means defines an elongated axis oriented approximately perpendicular to the centerline and includes fourth axially-elongated means for gripping extending axially and laterally on one side of the centerline and fifth axially-elongated means for gripping extending axially and laterally on an opposite side of the centerline relative to the fourth axially-elongated means for gripping, wherein the fourth and fifth axially-elongated means for gripping are approximately symmetrical about the centerline and extend axially from approximately one side or corner of the device to another side or corner of the device.

23. A device as defined in claim 22, wherein the first means is a laterally-extending grip manually engageable by at least one hand to grip the device and pull a hose and nozzle assembly attached thereto.

24. A device as defined in claim 22, wherein the first means is further for manually gripping the device from behind the back and pulling the hose and nozzle assembly secured thereto from behind the back.

25. A device as defined in claim 24, wherein the fourth axially-elongated means includes a right laterally-extending grip that is manually engageable behind the back by a right hand, and the fifth axially-elongated means includes a left laterally-extending grip that is manually engageable behind the back by a left hand.

26. A device as defined in claim 22, wherein the second means is a lock spaced below the first means and releasably engageable with at least one of the hose or nozzle of the hose and nozzle assembly, wherein at least one of the lock or hose and nozzle assembly is movable relative to the other between (i) a locked position, wherein the hose and nozzle assembly is secured by the lock to the device and the hose and nozzle assembly is supported therefrom, and (ii) an unlocked position, wherein the hose and nozzle assembly is released from the lock and detached from the device, and the third means is an aperture defining a nozzle-engaging portion.

27. A device for pulling a hose and nozzle assembly, comprising:
a laterally-extending grip defined at least in part by at least one laterally-extending aperture; and
a lock spaced below the grip, wherein the lock includes an aperture defining a fixed width or diameter and a centerline, a nozzle-engaging portion engageable with at least one of the hose or nozzle of the hose and nozzle assembly and a nozzle release portion, the nozzle-engaging portion defines a first fixed width or diameter that is engageable with the nozzle to thereby support the nozzle in a locked position, and the nozzle-release portion defines a second fixed width or diameter that is greater than the first width or diameter and that allows the nozzle to pass through the nozzle release portion and thereby allow detachment of the hose and nozzle assembly from the device, at least one of the lock or hose and nozzle assembly is movable relative to the other of the lock or hose and nozzle assembly between (i) the locked position, wherein the hose and nozzle assembly is secured by the nozzle-engaging portion to the device and the hose and nozzle assembly is supported therefrom, and (ii) an unlocked position, wherein the hose and nozzle assembly is released from the nozzle-engaging portion and detached from the device, wherein the laterally-extending grip includes a first gripping portion extending laterally on one side of the centerline and a second gripping portion extending laterally on an opposite side of the centerline relative to the first gripping portion, and in the locked position, the first and second gripping portions of the laterally-extending grip are manually engageable on opposite sides of the centerline relative to each other to pull the device and thereby pull the hose and nozzle assembly secured thereto.

28. A device as defined in claim 27, wherein the nozzle-engaging portion and the nozzle-release portion of the lock aperture are interconnected and allow manual movement of the nozzle between the locked position engaging the nozzle-engaging portion and the unlocked position in the nozzle-release portion.

29. A device as defined in claim 28, wherein the nozzle-release portion is approximately circular shaped, and the nozzle-engaging portion is approximately partial elliptical shaped.

30. A device as defined in claim 28, wherein the nozzle-engaging portion is located below the nozzle-release portion to allow gravitational force and the mass of the hose and nozzle assembly to retain the nozzle within the nozzle-engaging portion.

31. A device as defined in claim 27, wherein the nozzle-engaging portion and the nozzle-release portion define an approximate keyhole shape.

* * * * *